United States Patent

[11] 3,619,632

| [72] | Inventor | Raymond A. Labombarde |
| | | Daniel Webster Hwy., Nashua, N.H. 03060 |
| [21] | Appl. No. | 829,240 |
| [22] | Filed | June 2, 1969 |
| [45] | Patented | Nov. 9, 1971 |

[54] OUTBOARD GENERATOR UNIT FOR SAILBOATS
9 Claims, 2 Drawing Figs.

[52] U.S. Cl. .................................................... 290/43, 290/54, 114/39
[51] Int. Cl. ........................................................ F03b 13/10
[50] Field of Search .......................................... 290/54, 55, 43, 44; 114/39

[56] References Cited
UNITED STATES PATENTS
| 903,592 | 11/1908 | Low ........................... | 290/54 |
| 1,831,835 | 11/1931 | Allee .......................... | 290/54 |
| 1,898,973 | 2/1933 | Lansing ....................... | 290/54 X |
| 3,238,911 | 3/1966 | Pazulski ...................... | 290/55 UX |
| 3,411,013 | 11/1968 | Vogelsang .................... | 290/54 X |

*Primary Examiner*—G. R. Simmons
*Attorney*—Pearson & Pearson

ABSTRACT: Power generating apparatus suitable for use on sailboats and the like comprising a relatively large propeller means used as a submerged prime mover and rotatably mounted on the lower end of a substantially vertical, tubular housing containing a drive shaft, a gear assembly for converting said rotary motion of said propeller into a substantially increased rate of revolution for driving an alternator or generator mounted proximate the other end of the shaft above water level. The alternator is used to charge a battery carried inboard the sailboat.

PATENTED NOV 9 1971          3,619,632

INVENTOR.
RAYMOND A. LABOMBARDE

BY
Pearson + Pearson
ATTORNEYS

OUTBOARD GENERATOR UNIT FOR SAILBOATS

BACKGROUND OF THE INVENTION

Sailboats either lack electricity-generating means or only have such means when a gasoline engine is used to operate a generator. However, even when a gasoline engine is present on the craft, there are situations in which its use is either convenient or impractical. For example, if a craft has been under said sail for a major part of a day and comes into harbor, it is often either inconvenient or unpleasantly noisy to turn on the engine merely to operate lights, a refrigerator, or other such appliance.

Thus, it would be desirable to have a power-generating means which could keep a battery charged while a craft is under sail or at anchor in a current. Such a power-generating means would not only keep batteries charged but could also provide a continuous current when under said for operation of an automatic pilot and other apparatus on the craft.

Propeller-operated generators on motor driven craft are known in the art, but they are unfit for use in sailboats either because (1) they are fixed and in a position which would increase the drag of the boat excessively, or (2) because they are dependent on a rather high-speed craft for their utility. Some such devices are disclosed in U.S. Pat. 1,898,973 to R. P. Lansing and U.S. Pat. 903,592 to C. J. Lou, wherein the boat is driven by a central, stern-mounted, outboard motor with a submerged generator located off to one side, or in the keel area under the water line. In this invention the hydroelectric impeller, or propeller, is located centrally of the stern of the sailboat, to remain submerged even during tilt of the boat, but the generator is above water level rather than being submerged.

SUMMARY OF THE INVENTION

Therefore it i an object of the invention to provide an electricity-generating apparatus for use in conjunction with sailboats, in which the generator is above water level and connected to its propeller by a drive shaft within a substantially vertical tubular housing.

It is a further object of the invention to provide such an apparatus which is compact and which will not contribute excessively to the drag of the boat in the water even when it is being operated under power.

Another object of the invention is to provide an electricity-generating apparatus that is operable by a relatively slow-moving fluid stream.

Other objects of the invention will be obvious to those skilled in the art on reading the instant specification.

The above objects have been substantially accomplished by provision of apparatus comprising a relatively large propeller right angularly mounted on the lower end of an outboard motor type vertical shaft and operably connected, through a speed-increasing gear assembly, to a generator mounted at the top of the shaft. This entire apparatus is adapted for pivotal clamp mounting on the stern of a sailboat; therefore, the propeller can be easily lowered for submergence in the water under sail and at a position that will cause minimum water turbulence and difficulty in handling the craft.

The most advantageous form of generator is that commonly called an alternator.

The propeller which is the prime mover in the apparatus of the invention, in order to provide sufficient torque at water speeds of a sailing vessel, must be relatively large. Suitable propeller diameters will be considerably larger than those provided on conventional outboard motors because of the necessity of having a high enough torque to operate the generator. Since the propeller, or impeller is driven rather than driving, it may be relatively lightweight.

A moderate sized sailboat would utilize a propeller of at least about 12 inches in diameter. In the more advantageous embodiments of the invention, larger diameter propellers are made practical by having means for sliding the propeller, or unit, upwardly so that the propeller clears the water when tilted, without requiring the travel of tilting movement to be greater than about 60°. It is also desirable to equip the apparatus of the invention with manual or mechanical starter means so that the initial turning of the propeller may be accomplished at the minimum water speed. This is especially important in sailboats because they frequently will spend several hours operating at relatively low water speeds when opposed by wind and/or riparian or tidal currents, i.e. at speeds sufficient to sustain but not sufficient to start the rotation of the propeller.

Larger sailboats may utilize a plurality of such propellers to obtain a high rate of power generation, e.g. rates of up to 100 amps and more.

Figure 1:
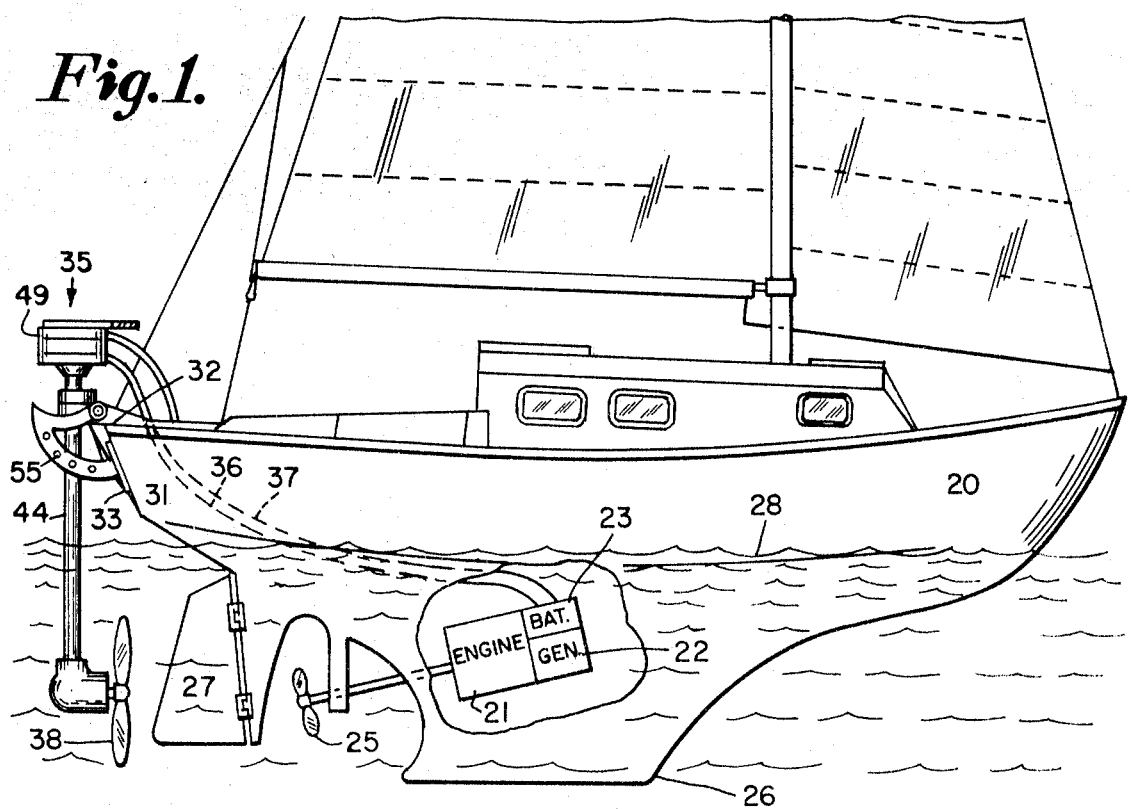
FIG. 1 is a side elevation of a typical auxiliary powered sailboat showing the apparatus of the invention outboard mounted thereon.
Figure 2:
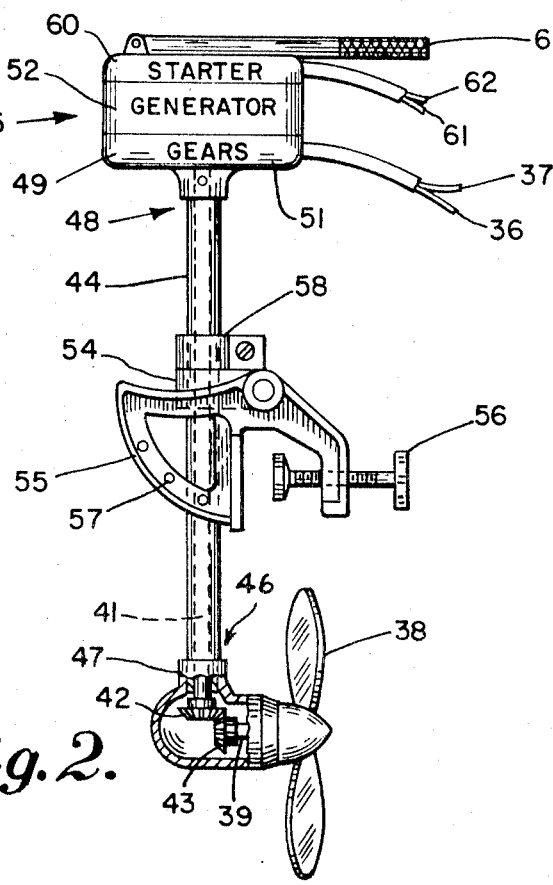
FIG. 2 is an enlarged side elevation of the apparatus of he invention. As shown in the drawings, a typical sailboat 20, for example of 20, 30, or more feet in length, includes an inboard auxiliary engine 21, a generator 22 operated by the engine, and a battery 23, charged by the engine 21 during engine travel of the boat. Battery 23 is usually of the 24 volt, 50 ampere type and is used to energize the lights, refrigerator and other electrical apparatus of the boat when the boat is underway or at dockside or moored. It will be understood that to avoid running down of the battery it is necessary to operate the engine 21, or a separate gasoline engine powered generator, if the stay is prolonged and that this is extremely noisy in a quiet sailboat. It will also be understood that when under sail, if the battery 23 is used to operate an automatic pilot, it will run down the battery unless an engine is started to recharge it.

The engine 21 drives a propeller 25, of predetermined diameter in accordance with the specifications and characteristics of the boat 20, the propeller 25 being usually located in rear of the keel 26 proximate the rudder 27 and, of course, below the waterline 28. The stern structure 31 of sailboats varies considerably, but, in general, the center of the stern, as at 32, is several feet above water level, and the stern is usually inclined, as at 33.

The hydro-electric unit 35 of this invention comprises an electricity-generating device which is outboard mounted, preferably at the center 32 of the stern 31, for ready detachability and tiltability. Unit 35 is auxiliary in the sense that it is intended for use in recharging battery 23, through cables 36 and 37, when boat 20 is under sail, either to permit automatic pilot operation under sail, or to otherwise assure a fully charged battery after a day of sailing.

Hydroelectric unit 35 includes an impeller, propeller, or water mill 38, mounted to rotate in a vertical plane on a horizontal axis comprising shaft 39, and to rotate the vertical drive shaft 41 through bevel gears 42 and 43, all watersealed in the tubular housing 44. While a flexible shaft, or other power connection, could be used, it is preferred for simplicity and cost reasons that tubular housing 44, and vertical shaft 41, be of rigid material, such as metal, several feet in length and, if desired, they can be telescopable. Housing 44 and shaft 41 extend from a lower end 46 at bevel gear case 47, under the water level 28 to an upper end 48 well above water level, there being a main casing 49 supported by upper end 48.

Power transmission means, or speed change means comprising a set 51 of reduction gears of any well known type, is connected to shaft 41 and interposed between shaft 41 and an electricity-producing generator, or alternator, 52, the latter feeding current to the cables 36 and 37. Impeller 38 is of predetermined, relatively large, diameter, so that it will be revolved even when the boat 20 is moving rather slowly under sail, the speed change mechanism 51 increasing the speed of rotation for turning the generator at its conventional speed.

Unlike an outboard engine, the impeller 38 is not intended, for example, to drive a heavy boat at high speed, but is intended only to be turned as the boat advances under sail, perhaps with pitch and roll and a certain whipping action. The housing 44, shaft 41, and gear case 47 are therefore somewhat light in construction and reduced in diameter to present little drag while supporting impeller 38 in the wake or slip stream of the boat. At the center of the stern behind the rudder 27 and main screw 25, the impeller 38 is advancing in a location less subject to stress and strain than, for example, if it were trailing along one side or the other of the boat.

The housing 44 is slidable vertically in a yoke 54, the yoke being pivotable in an outboard motor type bracket 55, having a clamp 56 and pins 57 for preventing tilt when not desired. A split-sleeve clamp 58 is mounted on housing 44 so that the unit can be vertically positioned in bracket 55 with the impeller 38 at the preferred depth below the waterline 28.

Because sailboat travel is often slow, the main housing 49 preferably includes an electric starter 60, having cables 61 and 62 for connection to battery 23, to turn the generator and impeller to overcome the starting inertia of the same. A manual rope type starter can be used if desired, or there can be a clutch between the shaft 41 and generator 52 to permit the impeller to build up momentum before being connected to the generator.

It will be seen that the unit 35 somewhat resembles an electric outboard motor, except that the motors of electric outboards are of the submersible, sealed type and underwater with the propeller, the propellers are usually small in diameter, there is no reduction gearing, and the propeller is faced rearwardly to drive the boat. However, if desired, the generator 52, can be compound wound to be selectively a motor or generator, a pivotable handle 64 can be provided, and the unit 35 used to urge the boat 20 forwardly under power from battery 23, for example, during a prolonged calm, or for minor movements within a harbor or marina.

Preferably impeller 38 is of predetermined relatively large diameter, at least twice the diameter of the main propeller 25.

We claim:

1. In a sailboat of the type having an auxiliary inboard engine, an engine driven main propeller of predetermined diameter, a generator, and a battery recharged by said generator during engine propulsion of said boat, the combination of:
   an auxiliary, outboard, hydroelectric unit, detachably mounted centrally of the stern of said boat for recharging said battery during wind propulsion of said boat, said unit comprising,
   a rigid tube enclosing a drive shaft and having a lower end submerged in the wake of said sailboat and extending substantially vertically to an upper end located well above water level,
   a relatively large diameter propeller about twice the diameter of said engine driven main propeller mounted to rotate in a vertical plane on a horizontal axis at the lower end of said tube to rotate said drive shaft,
   a generator fixed at the upper end of said tube, above said water level,
   power transmission means associated with said tube and driven by said shaft, said means converting slow speed of said propeller to high-speed rotation of said generator,
   fixed pivot means for tilting said unit to lift said propeller out of the water
   and split clamp means on said unit encircling said tube for vertically moving said propeller to selected depths below water level.

2. In combination with a sailboat, having an auxiliary engine with a main propeller, an electricity generating apparatus detachably and tiltably mounted outboard of the stern of said boat, said apparatus including:
   a relatively large diameter impeller, or propeller, at least twice the diameter of said main propeller, and normally submerged below the water line, in the wake, or slipstream of said boat and adapted to be rotated while drawn through the water by said boat;
   an electricity-producing generator, or alternator, mounted on said apparatus above the waterline of said boat and outside the hull thereof;
   a substantially vertical, sealed, tubular housing, said housing containing drive shaft means operably connecting said normally submerged propeller to said generator for driving the same, and having said generator mounted thereon above said water line,
   speed change means in said apparatus, mounted above said waterline and interposed between said drive shaft means and said generator, to rotate said generator at high speed when said propeller is rotated at low speed.

3. A hydroelectric unit for use on a sailboat having an auxiliary engine driving a main propeller,
   a sealed hollow assembly having mechanical power transmission means therewithin, said assembly including a tubular housing mounted vertically outboard of the center of the stern of said boat, the lower end of said housing being below the waterline and normally submerged, and the upper end of said housing being above said waterline,
   an impeller mounted on the lower end of said housing for rotation in a vertical plane on a horizontal axis and operably connected to said power transmission means, said impeller being at least twice the diameter of said main propeller,
   an electricity-generator mounted on the upper end of said housing above said waterline and operably connected to said power transmission means,
   said generator being actuated as said impeller is drawn through the water by said boat when under sail.

4. A hydroelectric unit as specified in claim 3, wherein said sailboat includes a battery connected to said generator, said generator is compound wound to also serve selectively as a motor
   and said unit includes split sleeve, clamp means for moving said propeller vertically to a selected depth below said waterline.

5. A hydroelectric unit as specified in claim 3, wherein, said power transmission means includes reduction gearing means.

6. A hydro-electric unit as specified in claim 3, plus electric starter means operably connected to said impeller for initially turning the same to overcome the inertia thereof.

7. A hydroelectric unit as specified in claim 3, plus clamp means, tiltably and slidably supporting said housing on said stern, to permit said impeller to be turned from forward to rearward direction, to permit said housing to be lifted until said impeller is above said waterline and to permit said unit to be pivoted to raise said impeller above the waterline.

8. Electricity-generating apparatus suitable for use on a sailboat, having an engine driven main propeller, said apparatus comprising:
   a substantially vertical, hollow, tubular housing;
   a propeller at least twice the diameter of said main propeller rotatably mounted proximate the lower end of said housing, to rotate in a vertical plane below water level,
   a generator rotatably mounted proximate the upper end of said housing, above water level;
   pivot clamp means centrally of the stern of said sailboat, for tilting said shaft to raise said propeller, said means being positioned proximate said generator, above water level,
   speed-increasing gear means including a drive connection in said tubular housing, operably connecting said propeller and said generator to convert slow rotation of said propeller to faster rotation of said generator,
   and electrical storage means electrically connected to said generator for storing electricity generated thereby.

9. Apparatus as defined in claim 8, plus starter means on said apparatus for overcoming inertia thereof and thereby reducing the minimum water speed at which said apparatus is useful.